United States Patent [19]

Hudson

[11] Patent Number: 5,102,659
[45] Date of Patent: Apr. 7, 1992

[54] NATURAL ANTIOXIDANT COMPOSITIONS

[75] Inventor: Thomas J. Hudson, San Francisco, Calif.

[73] Assignee: Shaklee Corporation, San Francisco, Calif.

[21] Appl. No.: 551,403

[22] Filed: Jul. 12, 1990

[51] Int. Cl.$^5$ .................. A61K 35/78; A61K 31/355; A61K 31/34
[52] U.S. Cl. ................ 424/195.1; 514/458; 514/474
[58] Field of Search ............... 514/474, 458; 424/195.1

[56] References Cited

PUBLICATIONS

Cort, W. M., "Antioxidant Activity of Tocopherols, Ascorbyl Palmitate, and Ascorbic Acid and Their Mode of Action", *JAOCS*, 51:7, 1974 (321-325).
Sherwin, E. R., "Oxidation and Antioxidants in Fat and Oil Processing", *JAOCS*, 55, 1978 (809-814).
Bracco et al.., "Production and Use of Natural Antioxidants", *JAOCS*, Jun. 1981 (686-690).
Houlihan et al., "Elucidation of the Chemical Structure of a Novel Antioxidant, Rosmaridiphenol, Isolated from Rosemary", *JAOCS*, 61:6, 1984 (1036-1039).
Farag et al., "Antioxidant Activity of Some Spice Essential Oils on Linoleic Acid Acidation in Aqueous Media", *JAOCS*, 66:6, 1989 (792-799).
Sherwin, E. R., "Antioxidatns for Vegetable Oils", *JAOCS*, 53, 1976.

*Primary Examiner*—Frederick E. Waddell
*Assistant Examiner*—Raymond J. Henley, III
*Attorney, Agent, or Firm*—Majestic, Parsons, Siebert & Hsue

[57] ABSTRACT

Natural antioxidant compositions comprising ascorbyl palmitate, a mixed tocopherol concentrate, and rosemary extract are disclosed. The compositions can be used in place of synthetic antioxidants and are effective even in the presence of metals and minerals. In one embodiment of the invention, the inventive composition is added to a dietary vitamin/mineral supplement.

1 Claim, 1 Drawing Sheet

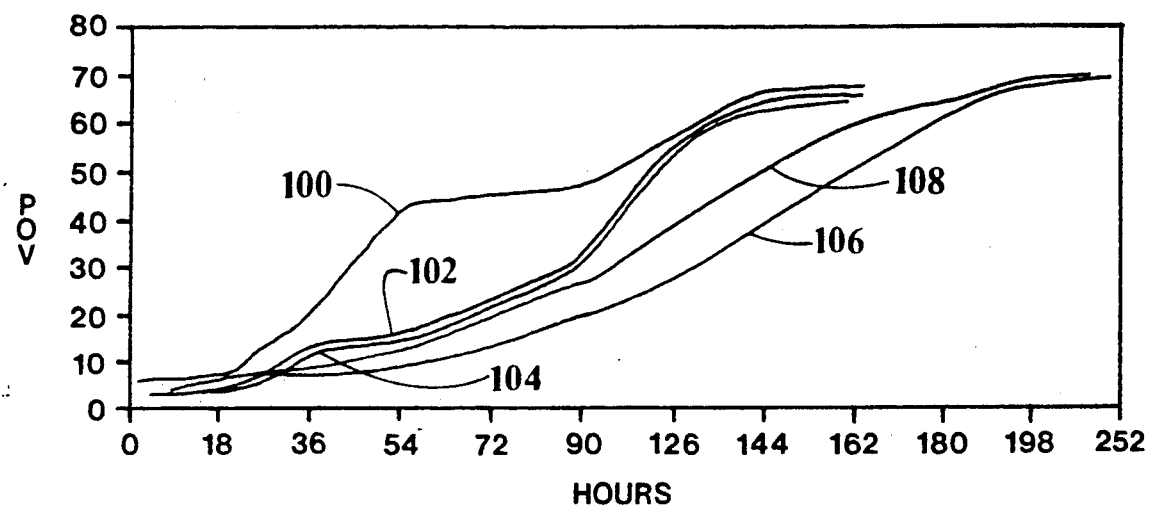
FIGURE — 1.
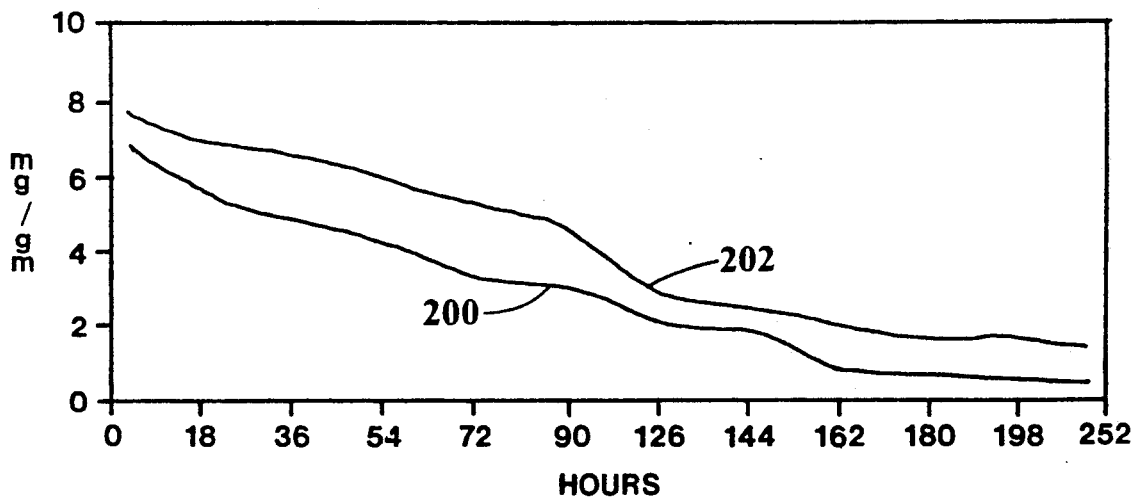
FIGURE — 2.

NATURAL ANTIOXIDANT COMPOSITIONS

FIELD OF THE INVENTION

The present invention relates generally to antioxidants, and more specifically to compositions containing ascorbyl palmitate, a mixed tocopherol concentrate, and rosemary extract. The compositions are useful for prolonging the shelf life of vitamin/mineral dietary supplements which are highly susceptible to rancidity.

BACKGROUND OF THE INVENTION

Oxidation of unsaturated fats and oils is essentially a degradation process which occurs at the double-bond sites in glyceride molecules—the building blocks of edible fats and oils. The process proceeds via what is commonly referred to as a "free-radical" mechanism in which the initiation step is the formation of a fatty free radical when hydrogen departs from the $\alpha$-methylenic carbon in the unsaturated fatty acid group of the oil molecule (RH). The resultant free radical (R.) becomes very susceptible to attack by oxygen to form an unstable peroxide free radical (ROO.). These free radicals themselves serve as strong initiators and promoters (catalysts) of further oxidation, hence oxidative breakdown of fats and oils becomes a self-perpetuating (autocatalytic) process, giving rise to a chain reaction. Auto-oxidation of highly unsaturated fatty acids can yield hard, tough, insoluble polymeric products. In the final or terminating stage of glyceride oxidation, hydroperoxides that form split or decompose into short-chain aromatic compounds (mainly aldehydes, ketones, alcohols, and acids), which cause the rancidity condition that ultimately destroys acceptability and usefulness of fats and oils.

Auto-oxidation is initiated or strongly catalyzed by a number of factors. Heat, for instance, greatly accelerates oxidation, especially at higher temperatures (above 60.C) where it has been estimated that for each 15° increase in temperature, the rate of oxidation reaction doubles. Another important factor is the presence of metals, which in just trace amounts are recognized as the predominant prooxidant materials encountered in commercial fats and oils. It is estimated that copper or iron at concentrations of less than 1 ppm can cause very serious reduction of fat and oil stability. This problem is magnified by free fatty acids which act to solubilize metals in fats or oils. Sherwin, E. R., "Oxidation and Antioxidants in Fat and Oil Processing", *JAOCS*, 55, 1978 (809-814).

Since the glyceride auto-oxidation is initiated and promulgated by the formation of free radicals, it follows that removal or inactivation of the fatty or peroxide free radicals should terminate, or at least interrupt, fat oxidation in its early stages, and thus delay breakdown into the final end products that are responsible for rancidity.

Antioxidants such as butylated hydroxytoluene (BHT) and butylated hydroxyanisole (BHA) are widely used in many foods to prevent fat rancidity. These compounds are added at concentrations ranging from 50 to 200 ppm to suppress the development of peroxides during food storage. The antioxidative activities of these synthetic substances stem from the phenolic configuration of their molecular structures. These phenolic substances function as free radical acceptors which can terminate fat or oil oxidation at the initiation stage. The antioxidant free radical that forms is stable and, most importantly, does not initiate or promulgate further oxidation of the glyceride.

It has been long recognized that tocopherol molecules, which have the phenolic configuration, exhibit antioxidant properties. There are at least seven types of tocopherol with the $\alpha$, $\gamma$ and $\delta$ isomers predominating in vegetable matter. Vitamin E activity is attributed mainly to $\alpha$-tocopherol, which also provides some oxidation inhibition effect in oil, but the $\gamma$ and $\delta$ forms are more effective antioxidants. Tocopherols are widely distributed in many vegetable matters from which commercial edible oils are extracted. Moreover, a high proportion of these "natural" antioxidants survive commercial oil processing to end up in the finished oils at levels as high as 500–1,000 ppm. These "residual" tocopherols are largely responsible for the oxidative stability inherent in finished vegetable oils. However, it is recognized that these tocopherol levels seem to be optimum for providing oxidative stability, and that addition of more will likely provide no further improvement in stability. Indeed, the addition of tocopherols to oils may even have a depressing effect on the oxidative stability of the oil, but further improvement in stability of finished oil may be achieved through addition of one or more of the approved synthetic oxidants. Sherwin, supra, at p. 813. One explanation is that the naturally present tocopherols mask additional activity. Cort, W. M. "Antioxidant Activity of Tocopherols, Ascorbyl Palmitate, and Ascorbic Acid and Their Mode of Action", *JAOCS*, 51:7, 1974 (321–325).

Besides BHT, BHA and tocopherols, there are a variety of other "primary" antioxidants which also function by inhibiting or interrupting the free radical mechanism of glycerine auto-oxidation. In addition, it has been long recognized that various acids (both organic and inorganic), and some of their derivatives, provide apparent antioxidant effect when added to vegetable oils. These are commonly referred to as acid-type antioxidants. However, these acids, if added alone to oils containing no primary antioxidant, will exhibit virtually no effect on the oxidative stabilities of the oil. It is believed that the acids are not truly antioxidants but more likely function by enhancing, in some manner, the activity of primary antioxidants naturally present (such as tocopherols) in the oils, or those antioxidants that are added. Common acid-type antioxidants include citric, phosphoric, thiodipropionic, ascorbic, and tartaric acids. Because these acids are generally insoluble in vegetable oils, they cannot be used directly with the primary antioxidants. Instead, it has been found that certain derivatives of these acids are effective. These include isopropyl citrate, didodecyl thiodipropionate, dilauryl thiodipropionate, dioctadecyl thiodipropionate, and ascorbyl palmitate. Sherwin, E. R. "Antioxidants for Vegetable Oils", *JAOCS*, 53, 1976 (430–436).

Unlike the primary antioxidants which function as electron donors, ascorbic acid and ascorbyl palmitate function by oxygen scavenging, an entirely different mechanism. Ascorbyl palmitate can be weighed directly into oils, dissolved in ethanol, and added to the oils or dissolved in a special oil, such as decaglycerol octaoleate. With the last method, solubility of 0.05 percent in oils can be achieved.

It has been found that tocopherols exhibit antioxidant activity in animal fats; moreover, their activity is enhanced by ascorbyl palmitate. Furthermore, with vegetable oils, addition of ascorbyl palmitate improves the shelf lives of the oils, although no further improvement is seen by the addition of tocopherols to vegetable oil. It would appear that the residual tocopherols in the vegetable oil is at the optimum level, and that antioxidant activity is not enhanced by adding more. Cort, supra, pp. 323–325.

A number of compounds have been isolated from herbs and spices which exhibit antioxidant activity. Carnosol and rosmanol, both phenolic diterpenes have been isolated from rosemary. More recently, another antioxidant, rosmaridiphenol, was isolated. The antioxidant activity of rosmaridiphenol surpasses BHA and approached the effectiveness of BHT. Houlihan et al., "Elucidation of the Chemical Structure of a Novel Antioxidant, Rosmaridiphenol, Isolated from Rosemary", *JAOCS*, 61:6, 1984 (1036–1039). However, the basic component of rosemary is borneol, which exhibits only slight antioxidant activity due to the absence of aromaticity. Farag, et al., "Antioxidant Activity of Some Spice Essential Oils on Linoleic Acid Acidation in Aqueous Media", *JAOCS*, 66:6, 1989 (792–799). It is believed that the antioxidant activity of rosemary extracts is primarily related to its carnosic acid and carnosol content. Moreover, rosemary extracts have been shown to have antioxidant activity comparable to BHA and BHT. Bracco et al., "Production and Use of Natural Antioxidants", *JAOCS*, June 1981 (686–690).

As consumers become increasingly conscious of the nutritional value and safety of their food and its ingredients, questions have been raised regarding the desirability of using synthetic antioxidants. There continues to be a critical need for effective natural antioxidants for use with vegetable oils. There is a need for natural antioxidants that remain effective even in the presence of minerals and metals.

SUMMARY OF THE INVENTION

It is an object of the present invention to provide a natural, edible antioxidant composition that can be readily added to foods.

It is a further object of the present invention to provide an antioxidant composition comprised of ascorbyl palmitate, a mixed tocopherol concentration, and rosemary extract, which is effective even in the presence of metals and minerals.

In one preferred embodiment of the present invention, the natural, edible composition consists of an antioxidant blend, comprised of 0.10 to 4.00 percent by weight of ascorbyl palmitate, 0.05 to 2.00 percent by weight of a mixed tocopherol concentrate; and 0.05 to 2.00 percent by weight rosemary extract. The antioxidative activity of the inventive composition far exceeds the activity level of the composition's individual components. The composition in accordance with the invention has been shown to significantly decrease oxidation of unsaturated fats and oils, $\beta$ carotene, and other substances subject to oxidation. The invention composition significantly prolongs the shelf life of products containing such substances. The inventive composition is an effective antioxidant even in the presence of metals or minerals.

Other objects and advantages will become apparent from the following description and appended claims.

BRIEF DESCRIPTION OF THE DRAWINGS

FIG. 1 is a graph of peroxide value versus time in measuring the progress of oil oxidation; and, FIG. 2 is a graph of $\beta$ carotene concentration versus time in measuring $\beta$ carotene oxidation.

DETAILED DESCRIPTION OF THE PREFERRED EMBODIMENTS

The invention is based in part on the discovery that certain compositions comprised of tocopherols, ascorbyl palmitate and rosemary extract exhibit extraordinary antioxidant activities.

The tocopherols used in the present invention preferably are in the form of a tocopherol-vegetable oil concentrate, wherein the tocopherols constitute 50 percent or more by weight of the concentrate. Moreover, of the tocopherols, the $\beta$, $\gamma$ and $\delta$ isomers constitute at least 80% of the tocopherols. The concentrate appears as a clear, brownish-red viscous oil. The concentrate is commercially available from the Henkel Corporation (Chicago, Ill.), under the label, "Coviox T-70".

The ascorbyl palmitate, which appears as a white or yellowish-white powder, is commercially available from Hoffman-LaRoche (Nutley, N.J.).

Finally, the rosemary extract is dissolved in a mixture of vegetable oil and mono- and di-glycerides. The mixture appears as a brownish liquid and contains the natural antioxidants present in rosemary. The extract mixture used is commercially available from Kalsec, Inc. (Kalamazoo, Mich.), and sold as "Herbalox Type O".

For convenience of handling, the tocopherol concentrate, ascorbyl palmitate, and rosemary extract mixture are usually premixed under oxygen-free conditions with vegetable oil, e.g., corn oil, to form a blend in the proportions set forth in Table I.

TABLE I

| Raw Material | Amount % Wt. | Preferred Amount % Wt. |
|---|---|---|
| Mixed tocopherol concentrate | 0.05 to 2.00 | 1 |
| Ascorbyl palmitate | 0.10 to 4.00 | 2 |
| Rosemary extract mixture | 0.05 to 2.00 | 1 |
| (Herbalox Type O) corn oil | QS | 96 |

In another embodiment of the invention, the inventive blend is added to products containing unsaturated oils or fats, beta carotene, and other substances that are subject to oxidation, to improve the product's shelf life. In one preferred formulation, mixed tocopherol concentrate, ascorbyl palmitate, and rosemary extract are added to a dietary vitamin/mineral supplement. Table II sets forth the ingredients and their relative proportions found in this preferred supplement. All of the separate ingredients are from commercially available sources. For convenience, the supplement can be packaged in capsule form.

TABLE II

| Ingredient | Percentage Weight |
|---|---|
| 1. Vitamins<br>$\beta$ carotene, ascorbic acid, d-$\alpha$ tocopherol, pyridoxine hydrochloride (vitamin B$_6$), vitamin B$_{12}$, and folic acid. | 60.168 |
| 2. Metals/Minerals<br>Zinc oxide, ferrous fumarate, copper gluconate, and selenium yeast. | 20.1835 |
| 3. Processing Aids and Excipient<br>Corn oil, soy lechithin and beeswax. | 19.627 |
| 4. Ascorbyl Palmitate | 0.0107 |
| 5. Mixed Tocopherol Concentrate | 0.0054 |
| 6. Rosemary Extract | 0.0054 |
| TOTAL | 100.0000 |

COMPARATIVE EXPERIMENTAL RESULTS

Experiments were conducted to determine the antioxidative activities of the inventive blend, the inventive dietary supplement, and various other substances.

1. Active Oxygen Method

In this procedure, the object is to force racidity to develop in the oil and to measure the resistance of the oil to achieve a level of rancidity. In this particular test, a peroxide value of 100 was chosen. The results are expressed in the number of hours to reach this level. Safflower oil, by itself and in combination with each of the inventive blend components, and safflower oil with the inventive blend, were tested. The experiments were conducted at 100° C. under atmospheric pressure and aeration with air. Set forth in Table III are the results of the experiment.

TABLE III

| Sample | Amount of Ingredient (Wt. %) | | | | Peroxide Value | | | |
|---|---|---|---|---|---|---|---|---|
| | Oil | Ascorbyl Palmitate | Tocopherol Conc. | Rosemary Extract | 10 Hrs. | 11 Hrs. | 12 Hrs. | 14 Hrs. |
| 1. SAFF | 100.0000 | 0.0000 | 0.0000 | 0.0000 | 74 | — | 100 | — |
| 2. SAFF/AP | 99.9785 | 0.0215 | 0.0000 | 0.0000 | 76 | — | 100 | — |
| 3. SAFF/T | 99.9785 | 0.0000 | 0.0215 | 0.0000 | 80 | 100 | — | — |
| 4. SAFF/R | 99.9785 | 0.0000 | 0.0000 | 0.0215 | 74 | — | 100 | — |
| 5. SAFF/TAP | 99.9785 | 0.01433 | 0.00717 | 0.0000 | 73 | — | 100 | — |
| 6. SAFF/Blend | 99.9785 | 0.0107 | 0.0054 | 0.0054 | 50 | — | 79 | 100 |

As is apparent from the data, the antioxidative activity of the inventive blend is superior to the activities exhibited by the other antioxidants. Most surprising is that the inventive blend's antioxidant activity far exceeds the activity level of the blend's individual components. The enhanced activity stems from cooperation among ascorbyl palmitate, the mixed tocopherols, and the rosemary extract. Indeed, it took an additional two hours for the inventive sample to reach the 100 peroxide value.

Since the test was conducted at 100° C. and with oxygen aerated through the samples, the two additional hours represent a significant improvement. This translates into approximately 26 weeks of additional shelf life for safflower oil under ordinary conditions. It should be noted that the addition of the mixed tocopherols actually increases oxidation. As discussed previously, it is believed that the residual tocopherols in the safflower oil (as are present in all the samples) may be at the optimum concentration, and that the addition of the mixed tocopherols masks further activity.

2. Peroxide Value Measurement

The progress of oil/fat oxidation can be monitored by measuring peroxide concentration. In this experiment, the level of peroxide was measured over time for five products: 1) safflower oil; 2) safflower oil with the inventive antioxidative blend; 3) safflower oil with BHT; 4) the dietary formulation as set forth in Table II; and 5) the dietary formulation, but without the ascorbyl palmitate, mixed tocopherol concentrate, and rosemary extract. Where BHT or the inventive blend is added, the amount added is 0.0215 percent by weight of the product. The experiments were conducted at a temperature of 60.C, at atmospheric pressure, and with warm air circulating over the samples. The results are set forth in FIG. 1.

Not surprising, as shown in curve 100 of FIG. 1, safflower oil, without any antioxidative additive, has the highest peroxide values (and hence, the highest oxidation rates). Curve 102 depicts the peroxide values of safflower oil with BHT, and similarly, curve 104 depicts the peroxide values for the safflower oil with the inventive blend. Curves 102 and 104 have the same general contour, but curve 104 (inventive blend) shows slightly lower peroxide values. Curves 102 and 104 demonstrate that the synthetic BHT can be replaced with the natural ingredients of the inventive blend without any loss of antioxidant activity. Indeed, the data indicates that the shelf life may be slightly improved. Curve 106 depicts the peroxide values for the inventive formulation as disclosed in Table II. Curve 108 delineates the peroxide values for the same product as curve 106, but without the inventive blend. Note that the inventive antioxidative blend significantly reduces oxidation even though minerals in the form of zinc oxide, ferrous fumarate, and copper gluconate are found in the dietary vitamin/mineral supplement. This is important since metals generally reduce the activity of antioxidative additives.

3. Beta Carotene Oxidation

It is well known that $\beta$ carotene, the precursor of vitamin A, is subject to oxidation. Often, $\beta$ carotene is added as a marker to a system so that by monitoring the $\beta$ carotene, the oxidative rate of the system can be gauged. In this experiment, the rate of $\beta$ carotene oxidation in the dietary formulation as set forth in Table II (with and without the inventive antioxidative blend) was measured, and the results are set forth in FIG. 2. (Obviously, the $\beta$ carotene in the formulation when consumed as a part of a dietary supplement functions as the precursor of vitamin A and not as a "marker".)

Curve 200 of FIG. 2 shows a steady decline in $\beta$ carotene for the dietary supplement without the inventive antioxidant blend. However, with the presence of the inventive blend in the supplement, the rate of $\beta$ carotene oxidation is reduced throughout the same time span, as is shown in curve 202.

It is to be understood that while the invention has been described above in conjunction with preferred specific embodiments, the description and examples are intended to illustrate and not limit the scope of the invention, which is defined by the scope of the appended claims.

It is claimed:

1. An antioxidant blend comprising ascorbyl palmitate, tocopherol concentrate, and rosemary extract mixture that is useful in prolonging the shelf life of food items and vitamin-mineral supplements that are susceptible to rancidity, the blend being mixed with a food item or supplement to form a dietary mixture thereof, wherein the antioxidant blend comprises approximately 0.02 percent by weight of the dietary mixture, wherein the ascorbyl palmitate comprises approximately 50 percent by weight of the antioxidant blend, wherein the tocopherol concentrate comprises approximately 25 percent by weight of the antioxidant blend, and wherein the rosemary extract mixture comprises approximately 25 percent by weight of the antioxidant blend.

* * * * *